United States Patent [19]
Franklin et al.

[11] Patent Number: 5,794,187
[45] Date of Patent: Aug. 11, 1998

[54] METHOD AND APPARATUS FOR IMPROVING EFFECTIVE SIGNAL TO NOISE RATIOS IN HEARING AIDS AND OTHER COMMUNICATION SYSTEMS USED IN NOISY ENVIRONMENTS WITHOUT LOSS OF SPECTRAL INFORMATION

[75] Inventors: David Franklin, Somerville, Mass.; Michael Steele, Seaford, N.Y.

[73] Assignee: Audiological Engineering Corporation, Somerville, Mass.

[21] Appl. No.: 687,014

[22] Filed: Jul. 16, 1996

[51] Int. Cl.$^6$ .................................................. G10L 3/02
[52] U.S. Cl. .................. 704/225; 704/271; 704/226; 381/68.2; 381/68.4
[58] Field of Search ............................. 395/2.23, 2.24, 395/2.34–2.37, 2.79, 2.8; 381/68, 68.2, 68.4

[56] References Cited

U.S. PATENT DOCUMENTS

| 4,025,721 | 5/1977 | Graupe et al. | 395/2.8 |
| 4,461,025 | 7/1984 | Franklin | 381/56 |
| 4,741,039 | 4/1988 | Bloy | 381/98 |
| 4,792,977 | 12/1988 | Anderson et al. | 381/68.4 |
| 5,305,420 | 4/1994 | Nakamura et al. | 395/2.8 |

OTHER PUBLICATIONS

Applications for Compandors NE570/571/SA571.Phillips Semiconductors RF Communications Products, Dec. 1991 pp. 172–173.

Unity Gain Level Programmable Low Power Compander. Phillips Semiconductors RF Communications Products, Nov. 1992 pp. 213–226.

*Primary Examiner*—Allen R. MacDonald
*Assistant Examiner*—Alphonso A. Collins

[57] ABSTRACT

Improved signal to noise ratio to help speech comprehension in a noisy environment is accomplished by selectively downwardly expanding a speech and noise composite signal when the speech signal is absent, thereby lowering signal components which represent noise. An expansion control signal is extracted from the composite input signal. Operation is based on the assumption that when noise alone is present, the input signal amplitude is less than some reference level and that when speech and noise are present together, the input signal amplitude is greater than the reference level. The response rates of gain changes are quite rapid, and do not introduce distortion or other audibly noticeable artifacts of the processing. The amount of downward expansion of the noise alone is small compared to noise gates to further reduce processing artifacts. The methods of realization include use of, in combination and alone, analog compressors and expanders, analog expanders in combination with voltage clamps and/or automatic level control circuits, two-quadrant multipliers in conjunction with digital control, entirely digital means for obtaining the requisite sensing and gain control, and expandor designs that are analogs of conventional filter designs where the notion of amplitude replaces frequency. Automatic noise suppression may be employed to pre-process the input signal, thereby rendering the control circuit self adjusting for better performance over a wide range of background sound levels. Various microphone, preferably providing directional characteristics, may be used to reduce noise levels in the received input signal.

41 Claims, 10 Drawing Sheets

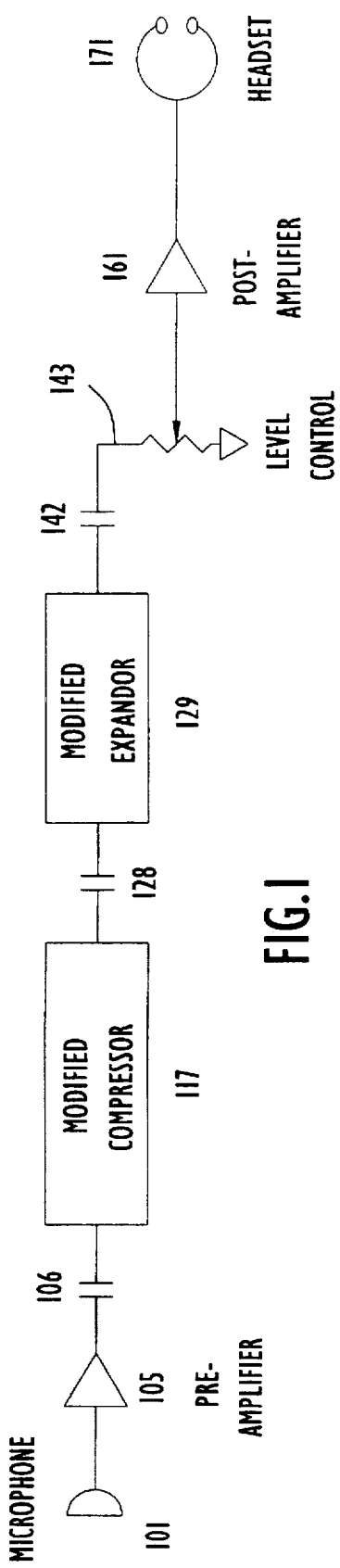
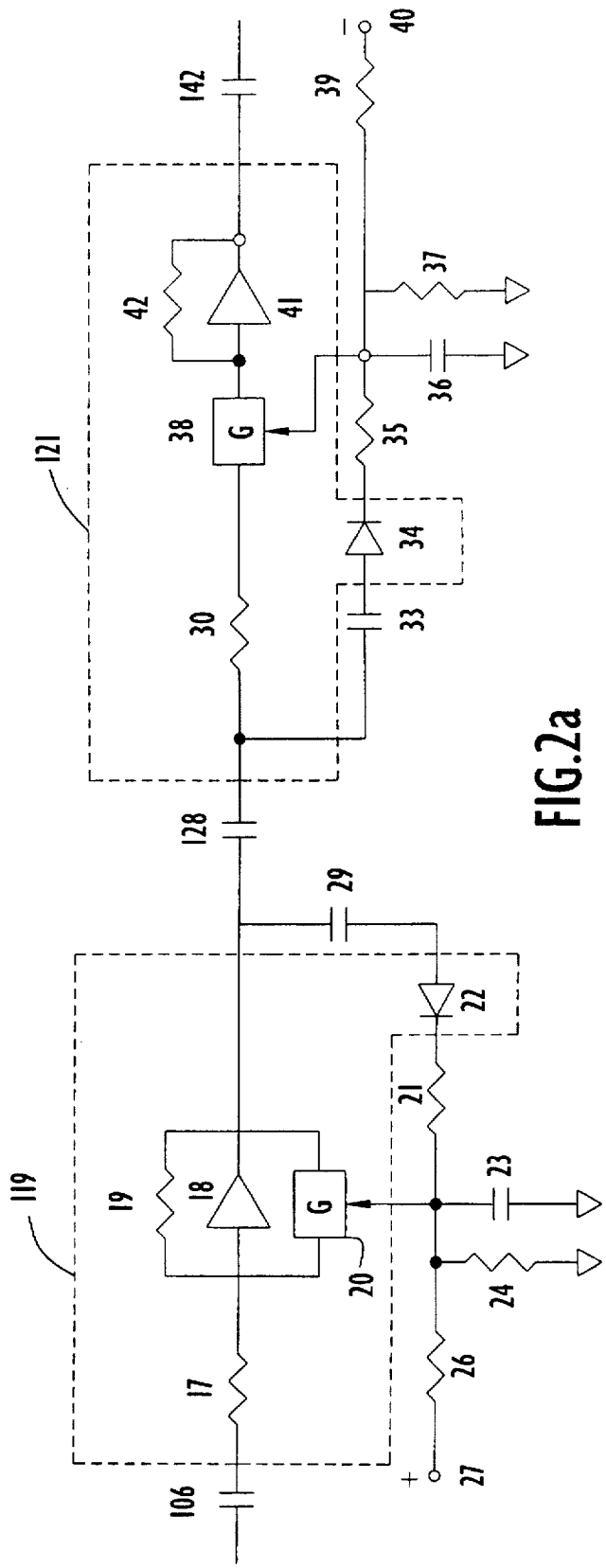
FIG.1
FIG.2a

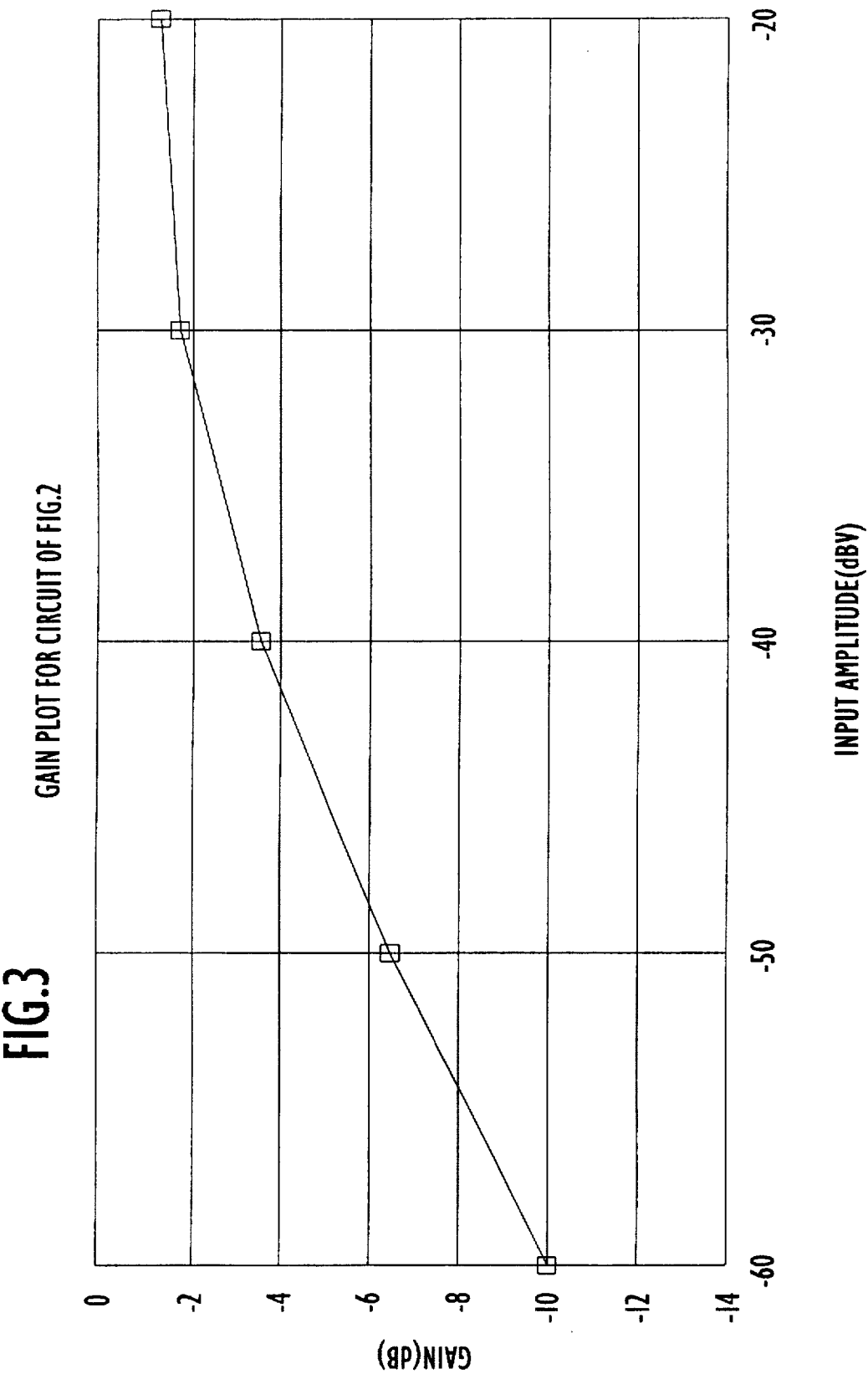

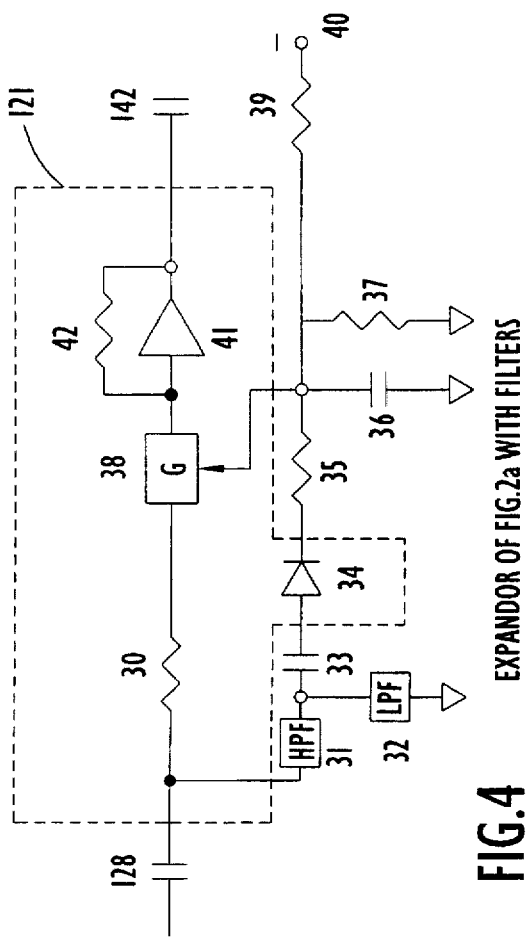
FIG.4 EXPANDOR OF FIG.2a WITH FILTERS
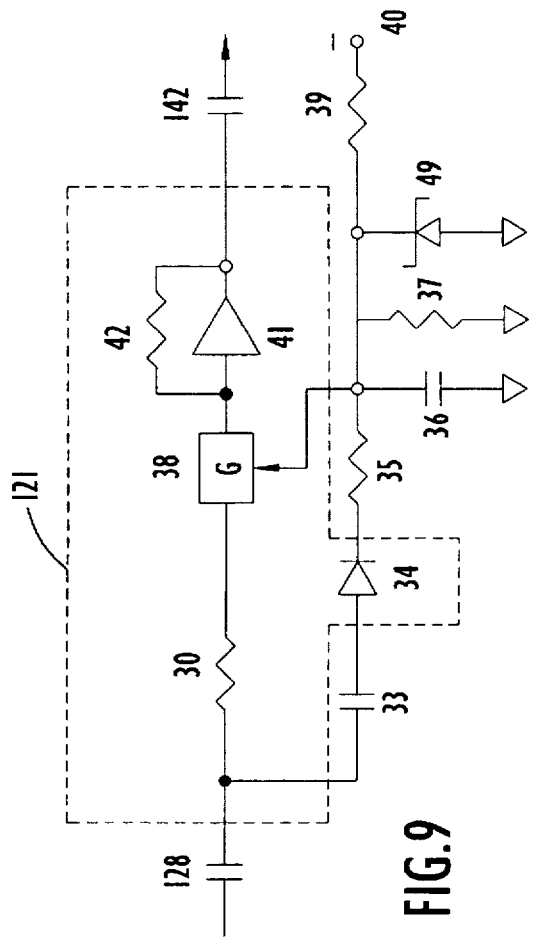
FIG.9

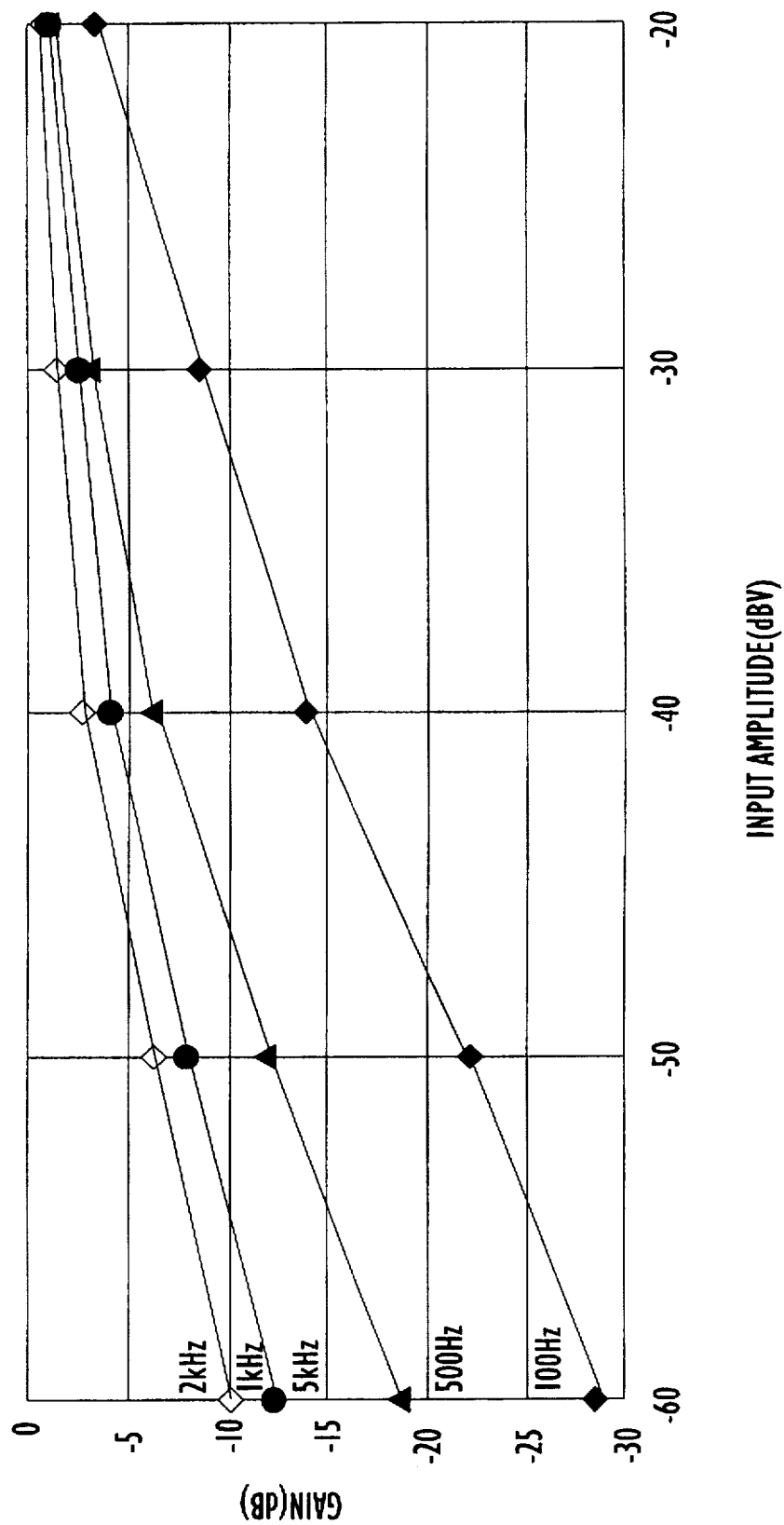
FIG.5 GAIN PLOT FOR CIRCUIT OF FIG.4 WITH HIGH PASS FILTER

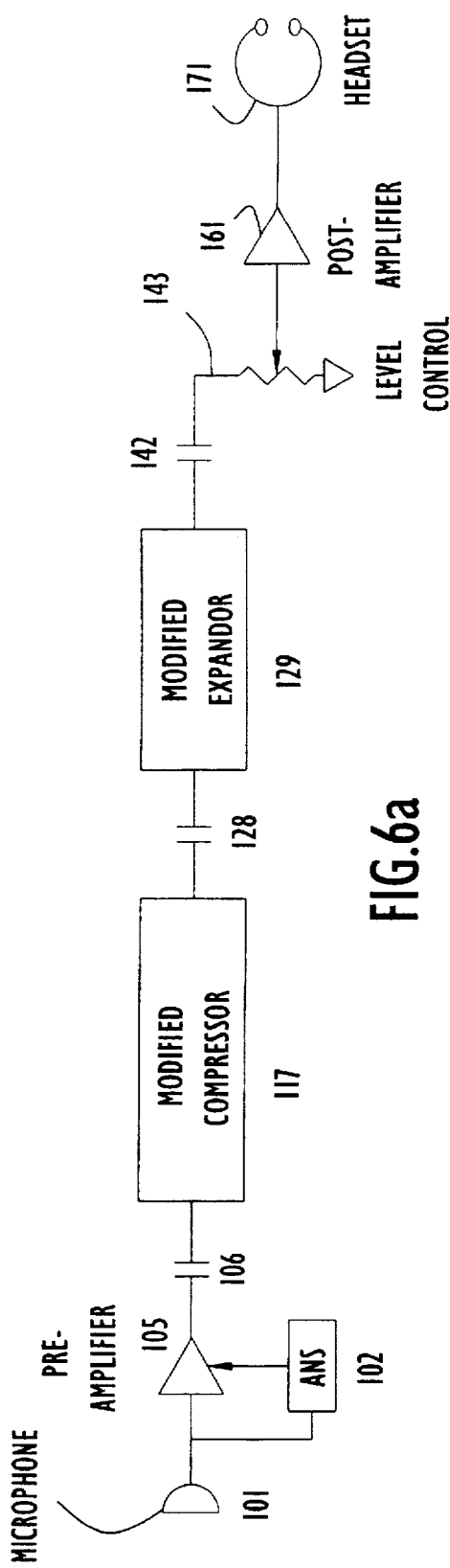
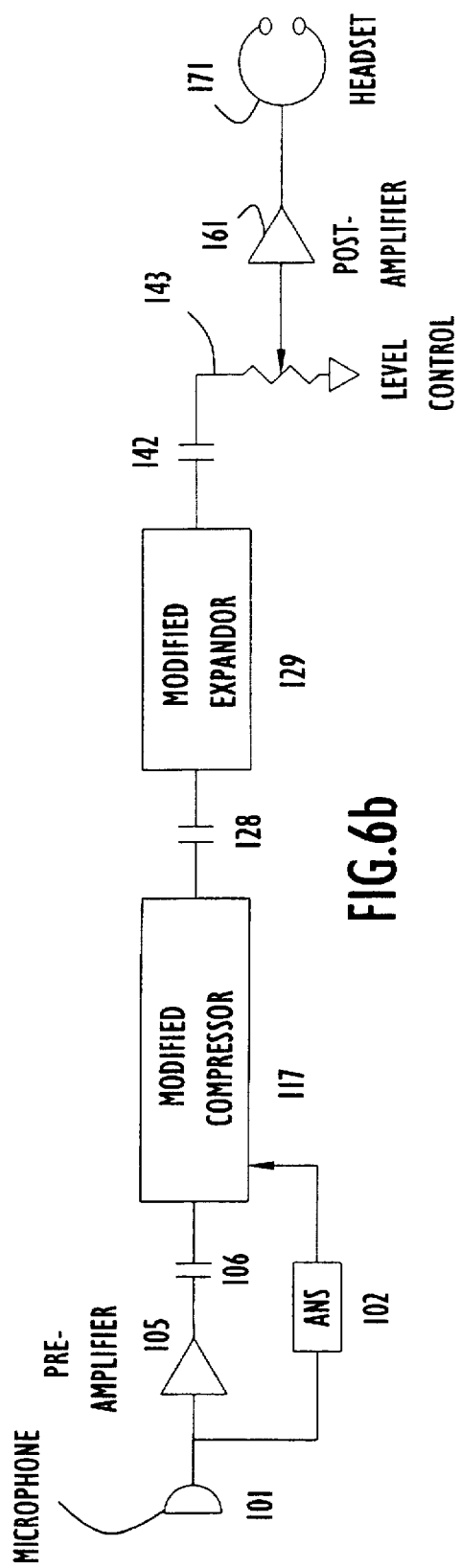

FIG.7
TRANSFER FUNCTIONS FOR RC HIGH PASS AND NON-LINEAR TRANSFORMATION (SUBSTITUTE x FOR $j\omega$)

FIG.7a RC HIGH PASS FILTER: GAIN(dB) vs. FREQUENCY ($\omega_0 = 1$ rad/s)

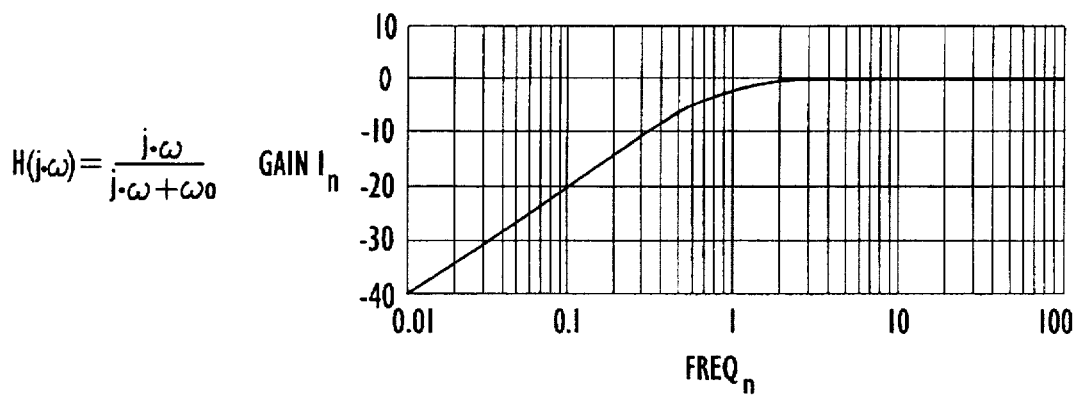

$$H(j\omega) = \frac{j\cdot\omega}{j\cdot\omega + \omega_0}$$

FIG.7b NON-LINEAR GAIN: GAIN(dB) vs. AMPLITUDE(dB) ($\alpha = 1$ VOLT/VOLT)

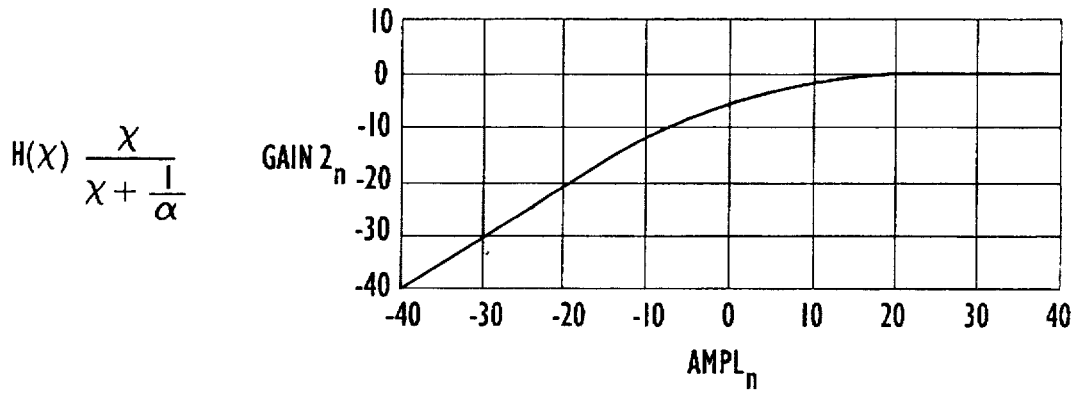

$$H(x) \quad \frac{x}{x + \frac{1}{\alpha}}$$

FIG.8 PRACTICAL CIRCUIT MODEL FOR NON-LINEAR GAIN CIRCUIT $$\text{GAIN} = \frac{R2}{R1} \cdot \frac{\overline{x}}{\overline{x} + \frac{R1 \cdot R2}{\alpha \cdot R_o}} \qquad \text{IF } R1 = R2 = R_o = 1: \quad \text{GAIN} = \frac{\overline{x}}{\overline{x} + \frac{1}{\alpha}}$$

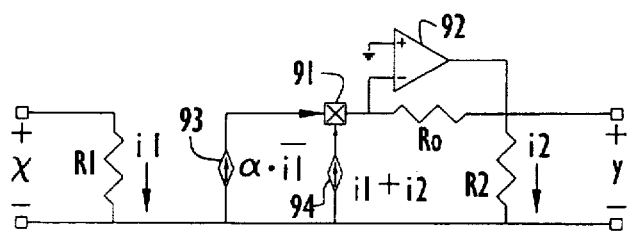

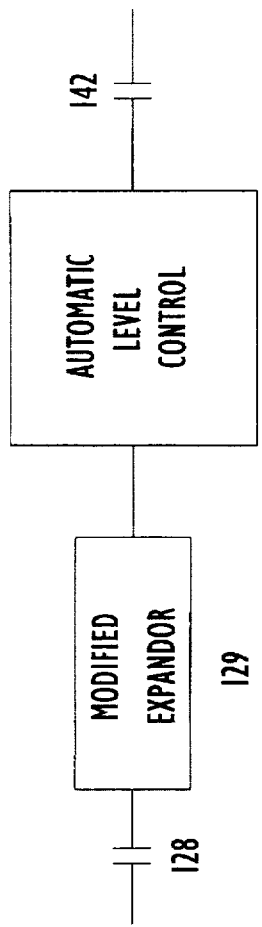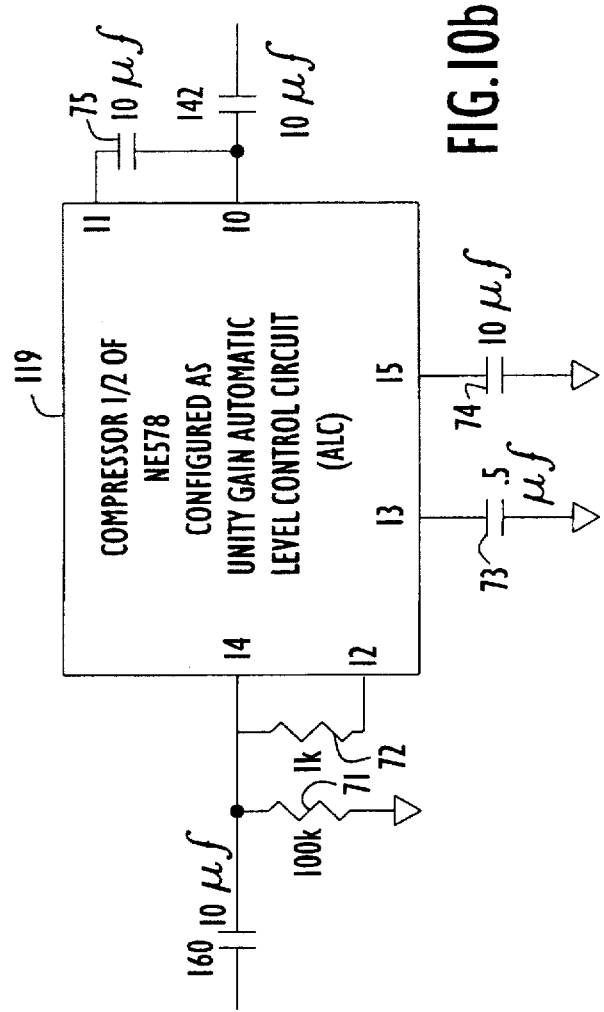

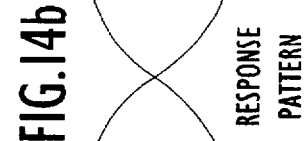
FIG.13a OMNI
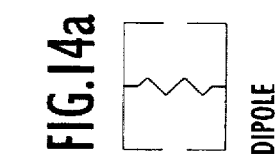
FIG.14a DIPOLE
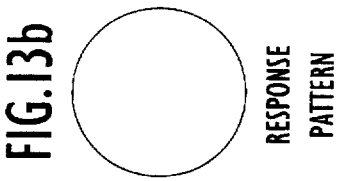
FIG.13b RESPONSE PATTERN
FIG.15b
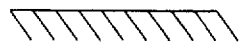
FIG.15a EXCLOID
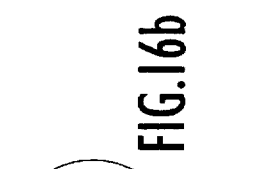
FIG.14b RESPONSE PATTERN
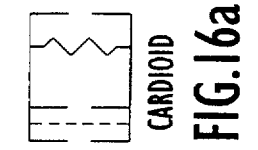
FIG.16a CARDIOID
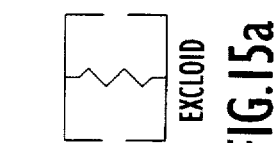
FIG.16b RESPONSE PATTERN
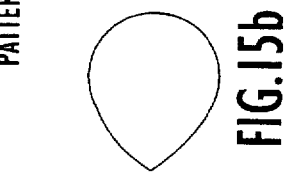
FIG.4
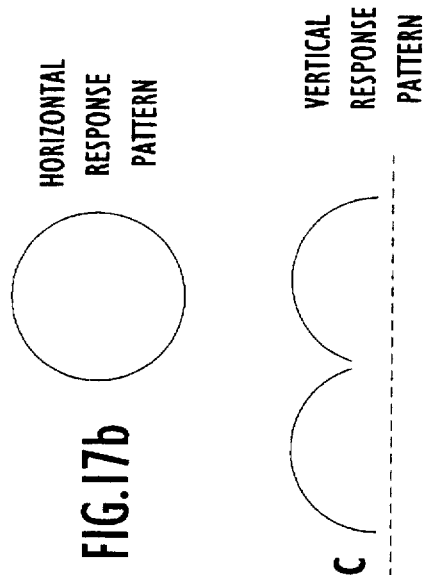
FIG.17a SUM OF 4 DIPOLES ON TABLE
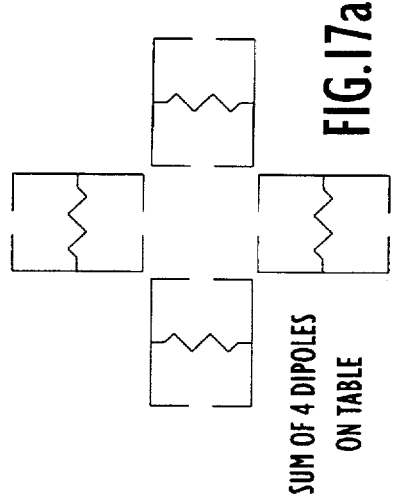
FIG.17b HORIZONTAL RESPONSE PATTERN
FIG.17c VERTICAL RESPONSE PATTERN

METHOD AND APPARATUS FOR IMPROVING EFFECTIVE SIGNAL TO NOISE RATIOS IN HEARING AIDS AND OTHER COMMUNICATION SYSTEMS USED IN NOISY ENVIRONMENTS WITHOUT LOSS OF SPECTRAL INFORMATION

BACKGROUND OF THE INVENTION

1. Technical Field

The present invention pertains to a method and apparatus for enhancing the effective signal to noise ratio of hearing assistive devices and other communication systems utilized in noisy environments without loss of spectral information. The enhanced effective signal to noise ratio enables improved comprehension of speech and reduced stress levels for a particular user of the hearing assistive device or communication system.

2. Discussion of Prior Art

Listening to speech in a noisy environment complicates speech comprehension and increases stress levels for particular listeners. These effects are especially prevalent for listeners suffering from significant hearing loss. Current methods to reduce the amount of stress and improve speech comprehension in noisy environments attempt to enhance the effective signal to noise ratio by elevating the desired speech above background noise. The elevated speech enables listeners to more easily discern speech from noise and therefore comprehend speech with reduced stress. These methods are generally employed in various systems and either attempt to bias against the quantity of noise received by the system in comparison with the quantity of the desired speech signal, or introduce processing that deletes some portion of the noise while retaining as much of the desired speech signal as possible.

Several major methods are currently being employed to decrease the noise in hearing assistive devices and various communication systems. Specifically, first order directional microphones are typically employed in order to reduce noise emanating from directions other than that of the desired talker or sound source. Second order directional microphones generally outperform both first order directional and omnidirectional microphones by wide margins, but are difficult to realize in hearing aids as discussed below.

Another method of noise reduction is referred to as automatic signal processing wherein bands of frequency containing the largest quantity of background noise are deleted, via processing, from the output signal. This technique is most commonly utilized in hearing aids.

A further method of noise reduction, commonly utilized in microphone conference systems, includes digital processing techniques to remove reverberation. In addition, digital processing techniques may combine spatial, spectral and statistical processes to improve the effective signal to noise ratio.

Yet another method of noise reduction includes the use of noise squelch circuits or noise gates. Noise squelch circuits typically cut off the output signal in response to the input signal level falling below a threshold. Noise gates perform a similar function as noise squelch circuits but are more sophisticated. Noise squelch circuits are often implemented in two-way telephone systems while noise gates are commonly utilized in high-end professional recording systems.

Still another method of noise reduction, referred to as automatic noise suppression, is disclosed in U.S. Pat. No. 4,461,025 (Franklin), the disclosure in which is expressly incorporated by reference herein in its entirety. This technique capitalizes on the use of encoded representations of received sounds by tactile aids and cochlear implants. The encoded signals are processed with a threshold in combination with a modified automatic gain control to decrease total output signal in response to a steady background noise causing undesirable results. The automatic noise suppression, in conjunction with the "Lombard Effect" wherein talkers unconsciously speak louder in noisy environments, results in the encoded signal appearing in the output signal at a higher intensity than the steady background noise.

The prior art noise reduction methods suffer from several disadvantages. The utilization of second order directional microphones to achieve improvements over omnidirectional microphones incurs significant monetary costs. Further, second order directional microphones are more complex and tend to have reduced performance in relation to certain other signal reception categories. In particular, second order microphones tend to be noisier than omnidirectional microphones and have a twelve decibel per octave (db/octave) decrease in output level as frequency declines. First order microphones are inadequate as they provide insufficient noise rejection to be effective, typically on the order of a three to four decibel or less improvement over omnidirectional microphones depending upon the application. This is particularly true when the microphones are mounted at ear-level, which is the usual placement for modern hearing aids, because the so-called "head-shadow" effect tends to further decrease the advantages of first order microphones as compared to omnidirectional elements.

Automatic signal processing is often ineffective because the rejection of some frequency bands to reduce noise tends to be offset by a loss of specific speech cues and, in certain situations, actually decreases a listener's ability to comprehend speech.

Squelch circuits and noise gates are ineffective for hearing assistive devices in their existing forms because their inherent ON/OFF switching characteristic leads to intrusive transients, either by accidental triggering due to noise spikes or by sudden changes in sound ambience due to abrupt transitions from almost complete silence to high sound levels. In general it can be stated that the coarseness of "squelch circuits" make them very intrusive in use, and that while "noise gate" designs are somewhat less intrusive, they still are too visibly obtrusive for the applications being considered here and, further, require complicated and power hungry technologies that make them impractical for applications for wearable devices such as hearing aids.

Automatic noise suppression, although effective for removing steady background noise, has no practical application to real time speech and is limited to the encoded systems of tactile aids and cochlear implants.

Digital noise reduction techniques, because of their cost, size and power consumption, are inapplicable to wearable hearing assistive devices and provide only modest gains for real time speech in any event. Some non-real time complex paradigms are very effective, particularly those utilizing a multiplicity of spatially separated microphone inputs, but they are clearly not applicable to hearing aid use or, for that matter, any other application where "real-time" listening is a requirement.

OBJECTS OF THE INVENTION

Accordingly, it is an object of the present invention to provide a method and apparatus to improve speech comprehension in a noisy environment and thereby reduce listener stress.

It is another object of the present invention to use electronic circuits in conjunction with directional or omnidirectional microphones to enhance the level of desired speech signal components within received speech signal waveforms by more effectively rejecting ambient noise components.

Yet another object of the present invention is to improve speech comprehension in a noisy environment by removing or decreasing the noise temporally existing around the desired speech signal components in response to the desired speech component energy being at or near a zero level.

Still another object of the present invention is to adjust the gain of a fast response non-linear gain control circuit as a function of the level of desired speech components, thereby improving speech comprehension in a noisy environment by decreasing the amplitude of noise temporally existing around the speech components.

A further object of the present invention is to improve speech comprehension in noisy environments by decreasing noise temporally existing around and/or within desired speech signal components in a speech signal waveform without introducing auditory distortions into the speech signal waveform.

Yet another object of the present invention is to improve speech comprehension in noisy environments by decreasing noise temporally existing around and/or within desired speech signal components in a speech signal waveform by use of small low-powered electronic circuits.

Still another object of the present invention is to improve comprehension of speech in noisy environments by decreasing noise temporally existing around and/or in desired speech signal components within a received composite speech signal waveform regardless of the frequency or type of noise and without detracting from the spectral cues of the desired speech signal components.

Yet another object of the present invention is to improve speech comprehension in noisy environments by decreasing noise temporally existing around and/or within desired speech signal components in a speech signal waveform through use of fast acting gain control circuitry adjustable for the amount of noise rejection desired. Further, the gain control circuitry may be adjusted in a range from little or no noise rejection to some level of maximal noise rejection for application to situations requiring noise reduction as well as to those situations where noise reduction is undesirable.

A further object of the present invention is to improve speech comprehension in noisy environments by providing an apparatus for reducing noise and enhancing the effective signal to noise ratio of the speech in combination with an automatic noise suppressor such that the noise reduction property of the apparatus is self-adapting according to the level of background noise and does not introduce undesirable distortions into a speech signal waveform.

Still another object of the present invention is to improve speech comprehension in a noisy environment by decreasing noise temporally existing around and/or within desired speech signal components within a speech signal waveform without introducing auditory distortions or artifacts of processing into, and without deleting information from, the speech signal waveform. Such distortions and artifacts of processing typically include: missing sounds, particularly beginnings of words or phrases; hangover of background noise after the desired speech signal terminates; perceived distortions due to amplitude surges; distortion due to extra spectral terms being added by the processing; clicks or other sounds resulting from changing gain; and sudden surges of noise due to inappropriate operation of noise gates based on background noise.

The aforesaid objects are achieved individually and in combination, and it is not intended that the present invention be construed as requiring two or more of the objects to be combined unless expressly required by the claims attached hereto.

SUMMARY AND THEORY OF THE INVENTION

According to the present invention, the effective signal to noise ratio of hearing assistive devices and communication systems utilized in noisy environments is improved in an unobtrusive manner by means of a control circuit using a rapidly acting noise gate having a particular range of dynamic transfer characteristic to adjust system gain based on the presence or absence of speech in a speech signal waveform. In particular, the dynamic transfer characteristic is required to provide a relatively small downward amplitude expansion for signal magnitudes smaller than some predetermined "cut-off" magnitude, and no effective expansion for signal magnitudes at or above the "cut-off" magnitude. In other words, the present invention processes a composite speech waveform including mixed speech and noise components temporally spaced by noise alone by expanding downward or attenuating by a small amount the noise alone. The mixed speech and noise is passed without substantial change. This is achieved by controlling circuit gain in response to input amplitude under the valid assumption that amplitudes below a predetermined level or "cut-off" constitute noise alone while amplitudes above that level constitute the mixed speech and noise. Amplitudes well above the predetermined level are passed at unity or some other constant gain. Amplitudes below the level are passed at a gradually decreasing gain (increasing attenuation).

By expansion it is meant that signals less than the cut-off magnitude be rendered smaller in amplitude as a consequence of the expansion, in so far as the output result of the signal processing is concerned. By relatively small expansion it is meant that amplitudes below the cut-off magnitude are downwardly expanded on the order of between slightly greater than unity and three, as compared to their input magnitude, when reckoned on the decibel measurement scale. Thus, an expansion of two means that a signal having a relative value of three decibels less than some other reference signal, provided the reference signal lies below the cut-off magnitude, shall become 6 db less than the reference signal after expansion by two; a similar signal expanded by a factor of three would become nine decibels less than said reference signal, and a similar signal expanded by 1.5 shall become 4.5 db less than said reference signal, and so on.

By fast or rapidly acting it is meant that the response time of the expansion shall take place over intervals on the order of five milliseconds up to about twenty milliseconds, and that the recovery times of the expansion shall be on the order of about twenty milliseconds to about eighty milliseconds. Stated otherwise, in as much as the expansion is effectively a decrease or increase in gain of the control circuits of the invention as a response to the magnitude of the input signals, such changes shall occur approximately within the stated times.

In contrast to the usual operation of noise gates, where large changes in gain are effected as a consequence of the magnitude of the composite input signal becoming greater or less than some reference level, in the present invention only small changes of gain are employed. As a consequence the control circuit is audibly transparent to a listener other than by the reduction of background noise level by factors of not greater than about three, as described above, and at such rates and manner as to provide no transitory audible effects other than reduction in background sounds.

It will be clear to one skilled in the art of electronic filters that the gain characteristics of the circuit of the present invention bear a striking resemblance to the gain characteristics of a high-pass filter, but instead of changes in frequency of input signals, one substitutes the notion of changes in amplitude of input signals. The analogy is as follows: If one considers a simple single pole high-pass filter, as might be realized by the connection of a single capacitor and a single resistor of appropriate values, in a conventional configuration, a frequency known as the "cut-off" frequency occurs such that for sinusoidal input frequencies at exactly the cut-off frequency, as determined by the values of the capacitor and the resistor, the resulting output signal is three decibels below the magnitude of the input magnitude. Further, any sinusoidal input at a still lower frequency produce an output signal level still smaller than the input level by a proportional amount which is asymptotic to six decibels per octave of the ratio between the two signal frequencies. In contrast, in the control circuit of the present invention input sinusoids above the cut-off magnitude are not affected in magnitude by the presence of the filter, provided they are far enough above the cut-off magnitude such that the output magnitude is substantially the same as the input magnitude. With this analogy in mind, then, one can use the same design equations to realize what will be referred to herein as a Time Domain Filter using active gain adjusting elements, except that where frequency is taken as a variable in the design of a first order high pass filter, the present invention substitutes amplitude. An example of such a design is provided among the possible preferred control circuit realizations described herein below.

It will be appreciated, in as much as an important goal of the aforesaid noise reduction is that no artifacts of processing shall occur, that any distortion introduced is highly undesirable. In view of this, and because the response times designated for the expansion rate (i.e., the rates at which circuit gain is changed) are rapid enough, one would expect such distortions to undesirably appear in the output signal to the detriment of the stated goals. That this is not so is an important teaching of this invention and is explained by the fact that for speech, unlike many other sound waveforms, the manner in which voiced sounds are generated assures that the harmonic distortion, inevitably caused by the relatively fast time constants employed, tends to overlay already existing harmonic terms such that the perceived experience for the most part is that no distortion occurs. The reasons for this are explained immediately below.

As is well known to persons skilled in the art of speech production technology, the source of voiced sound is the glottal pulse generated by the opening and closing of the glottis. This source, essentially a triangularly shaped burst of air-pressure, is rich in harmonics and in passing through the upper vocal tract causes the various cavities formed by the roof of the mouth, the tongue, the lips, the nasal cavities, and so-on, to resonate. Thus, what results as an audible consequence of voiced speech production is a set of dynamically changing harmonics of the glottal pulse. These harmonic terms are generally known as "formants" and characterize, in particular, vowel sounds, although they are also associated with voiced consonants. The important fact here is that all of these frequencies are, and can only be, harmonics of the base-frequency glottal pulse rate.

By the same token, the short time constants used in the expandor circuit discussed above have the purpose of causing the circuit gain to increase or decrease in the manner described. In so far as an analog realization of the circuit is concerned, this desired end is largely obtained by performing a multiplication on the composite speech signal, wherein the control signal used as a multiplier is the envelope of the speech signal itself. It is the low-frequency ripples contained in this control signal, present because of the fast time constants, which result in distortion. However, it is clear that for voiced speech the low frequency ripple found on the control waveform is dominated by the glottal pulse rate. Hence all the distortion terms are harmonics of this frequency and, in the case of voiced sounds, tend to overlay (or be superposed on) the so-called "formants".

It will be likewise well known to one skilled in the art of speech production that many speech sounds are not voiced, examples being /s/, /sh/, /t/ and others. It is in the nature of these unvoiced sounds that they are characterized by higher frequencies, generally greater than 2000 Hz for all talkers. For these frequencies the stated time constants are long enough so that no distortion occurs. Hence the above discussion of speech sounds is inclusive so far as distortion is concerned.

In the search for methods of improving speech comprehension for the hearing impaired, as contrasted to proper and satisfying hearing for the unimpaired, a method which is called "spectral enhancement" is known in the prior art wherein the goal is to exaggerate portions of the formants contained in voiced speech. To the extent that this technique of spectral enhancement is useful, and in view of the foregoing description, it is clear that one can obtain such spectral enhancement by using still shorter time constants. While speech processed this way is unpleasant to normal individuals having hearing, it may in fact result in superior comprehension for individuals with some forms of hearing loss.

From all that is said above it is clear that it is desirable for the unwanted background noise to appear at the input side of the control circuit at levels below the cut-off level as described, while the desired speech signal levels should be at or above the cut-off level. Thus, when background noise alone is present, it is expanded a small amount downward in magnitude, while the speech level is approximately unchanged as it passes through the control circuit. For this to be true it is necessary that there be an inherent difference in the received speech level and the noise level, the speech level always being larger. Beyond this, it is also clear that the noise level cannot be at any arbitrary magnitude but must indeed be such that it lies on the slope of the gain characteristics below the cut-off magnitude.

To some extent both of these requirements are met by utilizing a directional microphone aimed towards the desired speaker. This strategy taken together with an inherent tendency for talkers to speak louder in noise (i.e., the "Lombard Effect") suffices in many, but not all, situations such that the invention behaves as it should. That is to say, by judicious and careful design of the gain characteristics of the microphone and first amplifiers of such a system, one can assure that most of the time, in most situations, the noise and speech appear at the input to the control circuit at appropriate levels such that operation proceeds as desired.

However, still better performance over a wider range of conditions can be expected if some means is provided to adjust either the gain preceding the control circuit or the cut-off level of the control circuit itself so that the desired relationship between the noise and the cut-off level may be properly maintained. Means for attaining this improved operation is available from use of the method of Automatic Noise Suppression described in U.S. Pat. No. 4,461,025 (Franklin). Specifically, the Franklin patent discloses a slow-attack fast-release gain control to effect the changes in front-end gain or changes in cut-off level required to maintain the proper action of the control circuit in view of the louder speech sounds occasioned by the Lombard Effect in the presence of louder background sounds. That is, if louder background sounds are present, and the front end gain is reduced in response thereto, and/or the cut-off level is increased in response thereto, the net result is that the background sound signal remains below the cut-off magnitude, while the louder speech signal remains at or above the cut-off magnitude. An example of such an operation is described hereinbelow among the preferred embodiments.

A further teaching of the present invention is that, because it is desired to not lose any speech cues by limiting the bandwidth of the signal, but on the other hand there may be certain frequency bands of background sounds present that can in no way represent speech, it is possible to provide filtering in the control circuit of the invention in such a manner as to decrease the output level of the control circuit when noise alone is present without introducing band limiting in the signal. Specifically, the control signal may be prevented by filtering from operating at frequencies below about 400 Hz or above about 4000 Hz unless such frequencies are also accompanied by signals in the bands above 400 Hz and below 4000 Hz. One can thus be assured that such low frequency or high frequency signals, which would represent noise but not speech, will not increase the effective gain of the control circuit as much as speech signals do, and therefore some additional noise resistance is provided at minimum extra circuit complexity.

A final observation is made that, while the control circuit realizations described may infer analog circuits, it is clear that either microprocessor or digital signal processor methods can be used to realize the present invention, and such realizations are likewise described in the examples of preferred embodiment.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 1 is a schematic diagram of a circuit for enhancing the effective signal to noise ratio of speech in hearing assistive devices and other communication systems according to the present invention, utilizing the combination of a modified compressor circuit followed by a modified expandor circuit.

FIG. 2a is a schematic diagram of a portion of the circuit of FIG. 1 including the components of the modified compressor and expandor according to the present invention.

FIG. 3 is a plot of the gain of the circuit of FIG. 2a as a function of input amplitude.

FIG. 4 is a schematic diagram of a modified expandor for use in the circuit of FIG. 2a showing the inclusion of a filter in the control leg of the expandor.

FIG. 5 is a plot of the gain of the circuit of FIG. 2a modified with the expandor of FIG. 4 as a function of input amplitude for various frequencies when a high-pass filter is included in the control channel of the expandor.

FIGS. 6a and 6b are schematic diagrams of the circuit of FIG. 1 modified to utilize automatic noise suppression (ANS) in different respective configurations according to another aspect of the present invention.

FIG. 7a is a plot of gain vs. frequency for a typical high pass filter.

FIG. 7b is a plot of gain vs. amplitude for a control circuit of the present invention.

FIG. 8 is a schematic diagram of a practical circuit model for the present invention, derived using filter design methods.

FIG. 9 is a schematic diagram of another control circuit embodiment of the invention utilizing an expandor combined with a clamped control circuit.

FIG. 10a is a block diagram of another embodiment of the invention utilizing an expandor combined with an automatic level control circuit.

FIG. 10b is a schematic diagram illustrating an exemplary realization of the automatic level control circuit of FIG. 10a using a commercially available integrated circuit.

FIGS. 13a–13b are respectively an arrangement and response pattern for an omnidirectional microphone of the type employed by the present invention.

FIGS. 14a–14b are respectively a dipole arrangement and response pattern for a microphone of the type employed by the present invention.

FIGS. 15a–15b are respectively an excloid arrangement and response pattern for a microphone of the type employed by the present invention.

FIGS. 16a–16b are respectively a cardioid arrangement and response pattern for a microphone of the type employed by the present invention.

FIGS. 17a–17c are respectively a sum of four dipole arrangement and horizontal and vertical response patterns for a microphone of the type employed by the present invention.

DESCRIPTION OF THE PREFERRED EMBODIMENT

Figure 2B:
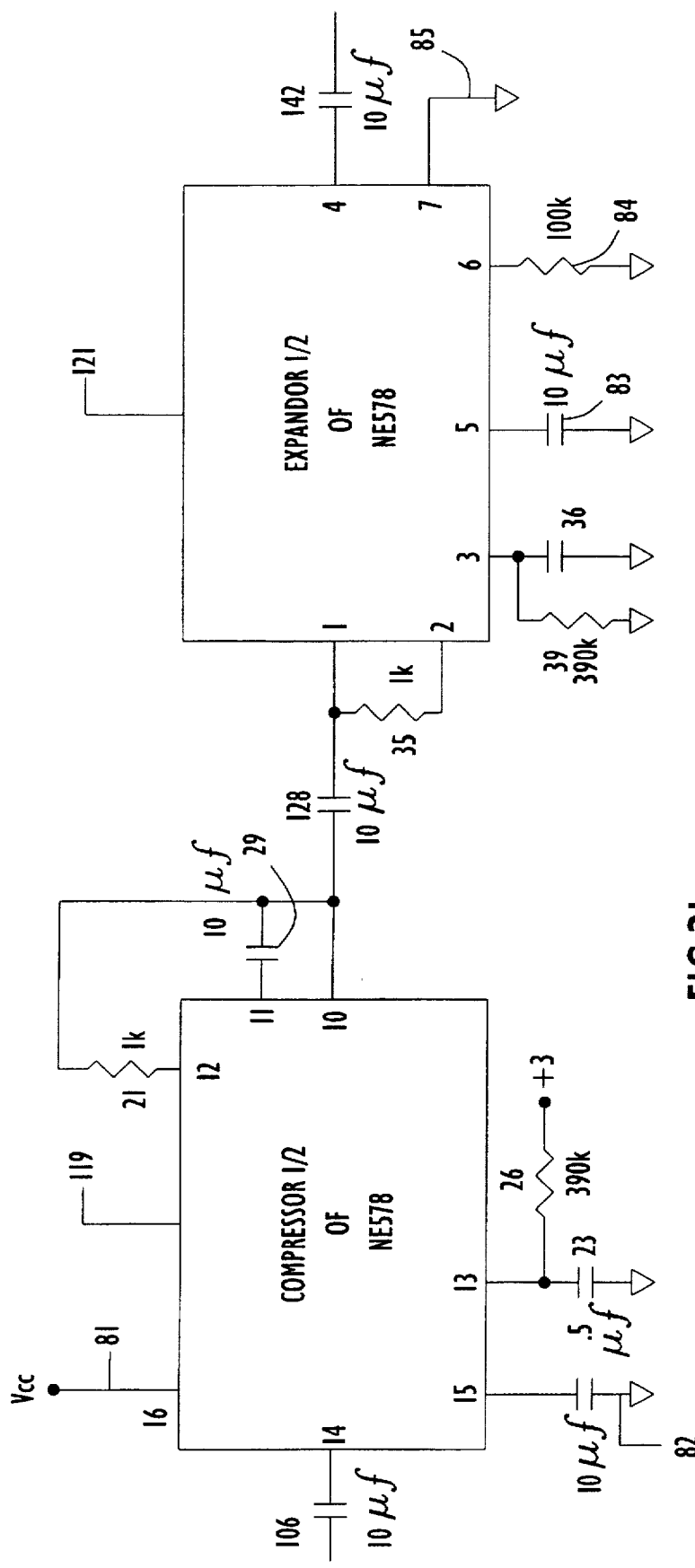
FIG. 2b is a schematic diagram of the circuit of FIG. 2a illustrating an exemplary realization of the modified compressor and expandor using commercially available integrated circuits.

One general configuration of a circuit embodiment of the present invention for enhancing the effective signal to noise ratio of hearing assistive devices and other communication systems in a noisy environment is illustrated in FIG. 1. Specifically, directional microphone 101 receives a composite speech signal waveform, typically including desired speech signal components and noise components and applies the waveform to a conventional preamplifier 105. The amplified waveform is applied through a capacitor 106 to modified amplitude compressor 117. Modified compressor 117 (i.e., modified from conventional compressors in accordance with the present invention) selectively compresses portions of the composite waveform amplitude pursuant to a non-linear compression function and is controlled by a compression control signal and bias or threshold level as described below. The compression control signal is extracted from the input signal and is a function of the presence and absence of the desired speech signal components as determined by input signal amplitude as discussed below. The amplitude-compressed waveform is subsequently applied through a coupling capacitor 128 to a modified amplitude expandor 129. Modified expandor 129 (i.e., modified from conventional expanders in accordance with the present invention) selectively expands portions of the compressed waveform amplitude pursuant to a non-linear expansion function which is substantially a dual function of the non-linear compression function performed in compressor 117. The expansion function is controlled by an expansion control signal and bias or threshold level as described below. The expansion control signal is a function of the presence and absence of speech signal components in the signal applied to the expandor in the presence of such components being again determined by the magnitude of the expandor input signal as described below. The resulting expanded waveform is a modified version of the original input waveform received by microphone 101 with an improved effective signal to noise ratio. The expanded waveform is applied through a coupling capacitor 142 across a level control 143. Level control 143, typically a variable resistor, permits adjustment of the level of the expanded waveform and applies the expanded waveform to post-amplifier 161. The amplified waveform is applied to a headset 171, or the like, for conveying processed sound from the enhanced composite waveform to a listener.

Exemplary embodiments of the modified compressor 117 and expandor 129 utilizing respective compressor and expandor portions 119, 121 of a commercially available compandor chip are illustrated in FIGS. 2a–2b. Specifically, the amplified waveform from preamplifier 105 (FIG. 1) is applied through capacitor 106 and a series input resistor 17 to the input terminal of an operational amplifier 18 having a negative feedback resistor 19 connected in parallel with gain cell 20. The amplifier, input and feedback resistors, and gain cell along with detector 22 may be commercially available as a compressor portion 119 of a commercially available compandor chip as described below. Gain cell 20 is typically a voltage controlled resistor and is controlled by a feedback signal via series connected decoupling capacitor 29, detector 22 and resistor 21 feeding charging current into integrating capacitor 23 which is discharged by parallel resistor 24 to adjust gain cell 20 and vary the gain of the compressor. This represents a compressor circuit yielding a compression function whereby the output signal amplitude is essentially the square root of the input amplitude referenced to some input level whence its gain is unity. A positive bias source 27 also charges capacitor 23 through a resistor 26 to modify gain cell operation so that for small signal levels, no compression occurs and the small level signals appear at the output at smaller magnitudes than if the bias source were not present. In particular, when the amplitude of the input signal is less than the bias, indicating the absence of speech or noise alone (under the above described assumption), detector 22 is reverse biased and prevents current from flowing to integrator capacitor 23. Capacitor 23 is then charged by current from only the bias source 27 and discharges a voltage through resistor 24 to set the resistance of gain cell 20 to a predetermined bias value. As the bias is typically small, input signal amplitudes not overcoming the bias tend to produce small currents which are insufficient to charge capacitor 23 to a sufficient level for applying voltage, via discharge resistor 24, for adjustment of gain cell 20 to compress the signal. Amplitude compression of the waveform at these levels is therefore inhibited. In response to the amplitude of the input signal overcoming the bias, as occurs in the presence of speech, current flows through detector 22 and series resistor 21 and combines with the current from the bias source to charge capacitor 23. Capacitor 23 charges sufficiently to apply voltage via resistor 24 to control the resistance of gain cell 20 and enable compression of the waveform to produce an output signal amplitude approximately the square root of the input signal amplitude as described above.

Modified compressor 119 hence selectively compresses components of the input waveform having amplitudes at or above some predetermined level, but does not compress or compresses less, components with amplitudes smaller than that predetermined level. The condition required for this selective compression to occur in a manner advantageous to the purposes of the invention, therefore, is that the amplitude of the composite input signal applied to the compressor 119 must be larger when the desired speech components are present and smaller when only noise is present. That this difference is significant for the purposes of the compressor then is an important operating requirement wherein the difference must be at least about three decibels, but preferably more. If this requirement is met, and if the bias resistor 26 and its bias source 27 are appropriately chosen, the operation of the compressor proceeds as described above. Specifically, the speech plus background signal will be compressed when present together, but the background signal alone is not so compressed and thus appears at the input to the modified expandor via capacitor 128 at a proportionately smaller level relative to the composite speech and noise signal than was the case prior to compression.

As discussed previously, the time constants of the compressor, determined by capacitor 23 and resistor 21 for the attack or charge time, and capacitor 23 and resistor 24 for the decay or discharge time shall be in the ranges specified above in the SUMMARY AND THEORY of Invention section.

There are several known techniques for improving the signal to noise ratio in deriving the compression control signal, including the use of a directional microphone for receiving the composite waveform (i.e., desired speech signal and noise). The directional microphone is aimed at the speech source such that the noise is received in a diffuse manner with reduced energy as compared to the speech signal. This technique improves the signal to noise ratio for both the compression control signal and the received composite input waveform.

The compressed amplitude waveform from modified compressor 119 is applied through capacitor 128 to modified expandor 121 for selective amplitude expansion. The expandor circuit 121 includes an input resistor 30 connected in series with a variable gain element 38 typically a voltage controlled resistor, in turn feeding an operational amplifier 41 having a negative feedback resistor 42. These components may be commercially available as an expandor portion 121 of a commercially available compandor chip as described below. A control signal is derived from the input capacitor 128 via coupling capacitor 33, detector 34 and charging resistor 35 feeding an integrating capacitor 36 connected to gain element 38. A discharge resistor 37 is connected across capacitor 36. The expandor is in essence a two-quadrant multiplier which multiplies the input signal from capacitor 128 by its own amplitude, thus yielding an output signal amplitude which is the square of the input amplitude with unity gain referenced to some value of input amplitude. A bias resistor 39 fed by its associated negative bias source 40 provides bias charge for capacitor 36 and thus modifies the expandor such that for input signal amplitudes less than some predetermined value, the output amplitude is expanded more than it would be were the bias not present. In particular, when the control signal amplitude is below the bias, detector 34 is reverse biased and prevents current from flowing to integrator capacitor 36. Capacitor 36 is then charged by current from only the bias source and discharges a voltage through resistor 37 to set the resistance of gain element 38. As the bias is typically small, control signal amplitudes not overcoming the bias tend to produce small currents which are insufficient to charge capacitor 36 to a sufficient level to apply voltage, via discharge resistor 37, for further adjustment of gain element 38. Amplitude expansion of the waveform at these levels is therefore inhibited. In response to the control signal amplitude overcoming the bias, as occurs in the presence of speech, current flows through detector 34 and series resistor 35 and combines with current from the bias source to charge capacitor 36. Capacitor 36 charges sufficiently to apply voltage via resistor 37 to control the resistance of gain element 38 and enable expansion of the waveform such that the output signal amplitude is approximately the square of the input amplitude as described above.

As in the compressor, the attack and release times of the integrator circuit comprising capacitor 36 and resistors 35 and 37 are chosen in the range described in the SUMMARY AND THEORY section hereinabove, and the bias resistor 39 and its negative voltage 40 are selected such as to provide the desired suppression of smaller noise signals. Hence, the combined effect of the modified compressor followed by the modified expandor is to provide unity gain, or nearly unity gain, for the amplitude of signal plus noise components greater than some predetermined value, and less than unity gain for the amplitude of noise-alone signals less than the predetermined value, but not large differences in gain for signal amplitudes at levels adjacent the predetermined value, this latter effect being important to the smooth audibly transparent operation of the invention.

FIG. 2b illustrates an exemplary realization of the modified compressor and expandor described above. The compressor may include external components connected to a compressor portion 119 of a commercially available compandor chip such as the NE578 manufactured by Signetics. The external components may include a $V_{cc}$ voltage source 81; a ten microfarad capacitor for use as an AC ground capacitor 82 connected in the feedback loop of amplifier 18; a ten microfarad capacitor for use as decoupling capacitor 29; a 1K ohm resistor for use as resistor 21; a 390K ohm resistor for use as resistor 26; a 3 volt voltage supply for use as positive bias source 27; a 0.5 microfarad capacitor for use as integrator capacitor 23.

Further, the modified expandor may include external components connected to an expandor portion 121 of the commercially available compandor chip described above. Capacitor 83, resistor 84, and ground line 85 are used for powering the chip from $V_{cc}$ line 81 and may include a ten microfarad capacitor and 100K ohm resistor, respectively. The external components of the modified expandor may include a ten microfarad capacitor for use as coupling capacitor 128; a 1K ohm resistor for use as resistor 35; a 390K ohm resistor for use as resistor 39; a zero voltage source for use as negative bias source 40; a 0.5 microfarad capacitor for use as integrator capacitor 36.

FIG. 3 illustrates a response curve (i.e., overall circuit gain as a function of input signal amplitude) for the circuit of FIG. 2a. it is noted that for input signal amplitudes above −30 dbv, the gain is substantially the same but drops off in a generally exponential manner for input signal amplitudes below −30 dbv.

Now referring to FIG. 4, another feature of the present invention is shown in which the necessary requirement that there be a significant difference in magnitude between the noise signal alone on the one hand, and the composite noise plus speech signal on the other hand, is attained by exploiting a specific inherent characteristic of speech. Specifically, since speech is by its nature a set of harmonics of the glottal pulse, when low frequency or high frequency signals occur alone, in the absence of significant energy in the band approximately between 400 Hz and 2000 Hz, it is known that speech is not present. Hence, if a high-pass filter set to pass only signals above about 400 Hz, or a low-pass filter set to pass only signals below 2000 Hz, or a combination of the two, is placed in the control signal line of the expandor as shown in FIG. 4, then extra protection against out of band output noise is attained. Importantly, there is no loss in speech bandwidth performance when speech is present, as signaled by the presence of energy above the cut-off magnitude in the band between 400 Hz and 2000 Hz. What is shown in FIG. 4 is the expandor portion of the circuit of FIG. 2a. The input signal from capacitor 128 is coupled to detector 34 by means of a high-pass filter 31 and low-pass filter 32, either of which may be used alone, to reduce the output signal from detector 34 by some amount if there exists no speech signal but only noise.

Now referring specifically to FIG. 5, plots of gain versus input amplitude are shown for the case where a high pass filter is included. The different response curves represent different filter cut-off frequencies shown in the drawing. Persons skilled in the art will appreciate from these plots the effect on the gain characteristic produced by a low-pass filter or combination of low-pass and high-pass filter used instead of only the high-pass filter.

FIG. 6a and 6b illustrate modifications to the control circuit of the present invention wherein the useful dynamic range is extended by including slow acting gain adjusting elements to adapt the invention response. What is shown in FIG. 6a is a circuit similar to that of FIG. 1 except that an ANS element 102 is included to slowly decrease the gain of pre-amplifier 105 in response to increased and sustained average noise level. The ANS element 102 is an automatic noise suppression circuit of the type disclosed in the aforementioned Franklin patent. In FIG. 6b an ANS element is provided to increase the cut-off level of modified compressor 117, again in response to increased and sustained average noise level. In either case, the net effect is to assure the required relationship of the noise being below the cut-off magnitude for the modified compressor. On the other hand, the aforesaid Lombard effect helps assure that the speech signal will be above the cut-off magnitude.

Referring specifically to FIG. 7a and 7b, graphs are presented comparing the gain response of a first order conventional high-pass filter (FIG. 7a) to a desired non-linear gain characteristic (FIG. 7b) of the present invention. What is seen is that if the complex function jw is replaced by the variable x, where $\bar{x}$ represents the RMS value of the input variable x, then what results is the response shown in the graphs wherein the abscissa of graph 7b is changed to indicate gain as a function of input amplitude instead of frequency as in graph 7a. It is noted that the "cut-off" amplitude in the non-linear gain plot of 7b occurs at −6 decibels instead of at −3 decibels as in the frequency plot. This occurs because the gain of the non-linear system of the present invention is not a complex function.

This design approach to non-linear gain noise suppressor circuits can be extended to include systems analogous to higher order filters, thus yielding responses showing expansions greater than 2 to 1. It is important to understand that the higher order transfer functions can contain only simple real-poles because, when the transformation from frequency to amplitude domain is made, there exists no analogy between complex frequency and amplitude, amplitude always being real. Keeping this in mind, systems can be designed which start with multiple high-pass filters which are cascaded to obtain the desired amount of noise suppression. At the same time it must also be kept in mind that the degree of transparency (i.e., unawareness by the listener of the signal processing taking place) required for the given application represents a limit on the amount of suppression that can be obtained. In effect, listening tests are required to determine this quantity.

FIG. 8 presents a practical circuit model derived by the methods described above that can be used to realize higher order responses in control circuits of the present invention. Specifically, in accordance with two port network analysis, resistors R1, R2 sample the input voltage x and the output voltage y to yield currents I1 and I2, respectively. Two dependent current sources 93, 94 generate currents which are applied to a current multiplier 91. The first current source 93 is typically an ideal root-mean-square (RMS) detector with a proportionality constant of $\alpha$, thereby yielding an output current substantially equal to the product I1·$\alpha$ (i.e., the RMS value of current I1 multiplied by $\alpha$). The second current source 94 is typically an ideal adder yielding an output current substantially equal to the sum of currents I1 and I2.

Current multiplier 91 may either be a two or four quadrant multiplier since the input from the first current source 93 is a positive quantity for $\alpha$ greater than or equal to zero. In the practical circuit realization, a two quadrant multiplier is used. The output of multiplier 91 is applied to an inverting input of an operational amplifier 92 having a feedback resistor $R_0$. Operational amplifier 92 and feedback resistor $R_0$ form a current to voltage converter which generates the output voltage of the circuit. The gain or transfer function of the model is:

$$\frac{R2}{R1} \cdot \frac{\bar{x}}{\bar{x} + \frac{R1 \cdot R2}{\alpha \cdot R_o}}$$

where $\bar{x}$ is the RMS value of the input voltage. By using one-ohm resistors for R1, R2, and $R_0$, the model has a transfer function which yields the desired gain characteristics or transfer function described above for FIG. 7b, namely:

$$\frac{\bar{x}}{\bar{x} + \frac{1}{\alpha}}$$

The resistors may be varied to achieve various desired gain responses. The circuit model may be realized by using the expandor portion of a Signetics Compandor IC, NE578 with external components connected to the chip as described above for FIG. 2b. The values and arrangement of the external components may be modified to accommodate various gain responses derived by using the model.

Referring now to FIG. 9, a simplified version of the control circuit of the invention is shown wherein only an expandor having a clamped control signal line is used. The circuit is identical to that of FIG. 2a except that a voltage clamp 49 (e.g., in the form of a Zener diode) is connected across the control capacitor 36 to prevent the gain from changing once the control voltage across the capacitor reaches the clamped voltage. Hence, as required by the invention, the gain becomes constant for signal and noise composites large enough to trigger the clamping action.

FIGS. 10a–10b show yet another embodiment of the invention where gain change is prevented as a consequence of increasing combined input signal plus noise by providing an automatic level control circuit after a single stage of expansion as said. In this embodiment expandor 129 is followed by a unity gain automatic level control circuit 150. If the output signal amplitude from expandor 129 exceeds the threshold level of the automatic level control circuit output, the output signal amplitude is not expanded and appears compressed. The automatic level control circuit 150 may be realized by utilizing external components in conjunction with a compressor portion 119 of a commercially available compandor chip such as the Signetics Compandor IC, NE578 as illustrated in FIG. 10b. The internal circuitry of the compressor portion 119 is substantially similar to the internal circuitry of the chip described above in reference to FIGS. 2a–2b. Specifically, the external components include coupling capacitors 160, 142 respectively connected to the input and output of the compandor chip, an input resistor 71 connected between the input of the chip and ground, a resistor 72 connected between the input to the chip and detector 22, an integrator capacitor 73 for controlling gain element 38, an AC ground capacitor 74 connected between the feedback of amplifier 41 and ground, and a decoupling capacitor 75 connected between the output of the chip and the gain element. By way of example only, the external components may be implemented by ten microfarad capacitors for use as the input and output coupling capacitors 160, 142 and the AC ground and decoupling capacitors 74, 75, respectively; a 1K ohm resistor for use as resistor 71; a 1K ohm resistor for use as resistor 72; and a 0.5 microfarad capacitor for use as capacitor 73.

Figure 11:
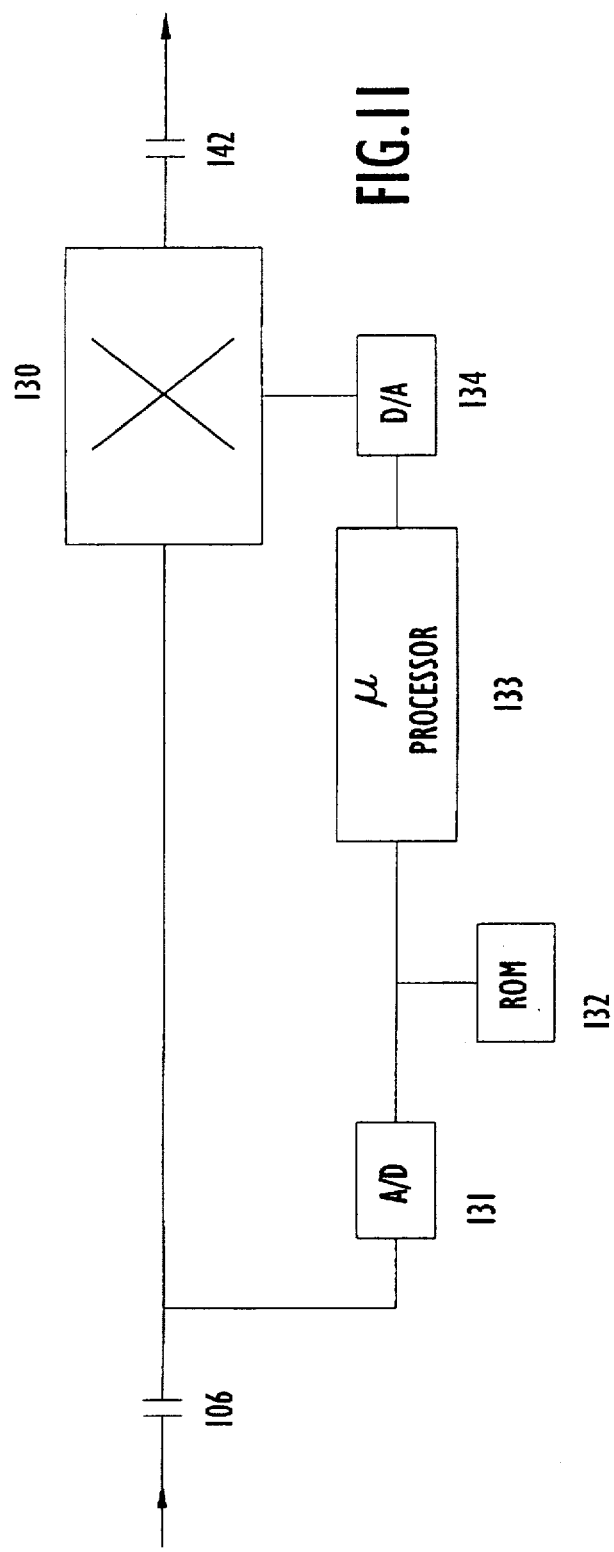
FIG. 11 is a schematic diagram of still another embodiment of the control circuit of the present invention utilizing digital control of the gain of a two-quadrant multiplier.

In FIG. 11 a schematic diagram of another embodiment is shown in which the gain of a two-quadrant multiplier 130 has its gain is controlled by the magnitude of the input signal. Specifically, the signal from capacitor 106 is applied to analog to digital convertor 131 which feeds a microprocessor 133. The digital microprocessor output signal is converted to an analog signal by digital to analog convertor 134 to control multiplier 130. The multiplier output signal is coupled through an output capacitor 142. A read-only-memory 132 is programmed according to the desired system gain characteristics to control microprocessor 133 for the application being addressed.

Figure 12:
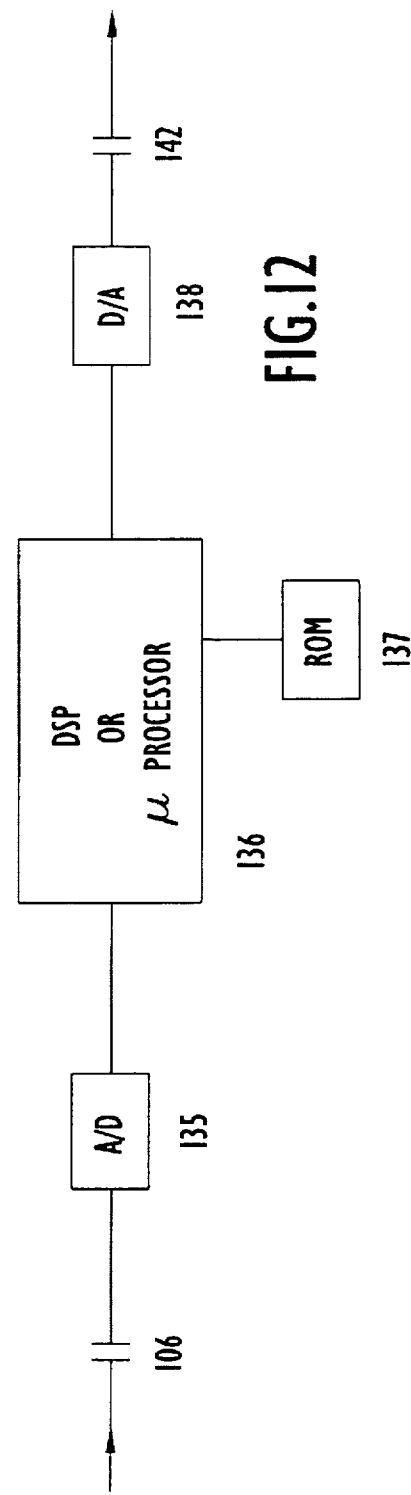
FIG. 12 is a schematic diagram of yet another embodiment of the control circuit of the present invention utilizing a digital signal processor or microprocessor.

An alternative all digital embodiment of the invention is shown in FIG. 12 wherein the input signal from capacitor 106 is fed via analog-to-digital convertor 135 to either a digital signal processor or microprocessor 136, and then via digital-to-analog convertor 138 to output capacitor 142, wherein the desired gain response is programmed in a read-only-memory 137.

Finally, FIGS. 13a, 14a, 15a, 16a, 17a illustrate some of the different microphone types that may be used with the present invention to generate the necessary input signals. The microphone types corresponding to the above figures respectively include: omnidirectional, dipole, excloid, cordiod and sum-of-four-dipoles. The corresponding response patterns for the aforementioned microphone configurations are respectively illustrated in FIGS. 13b, 14b, 15b, 16b, and 17b–17c. Attention is specifically drawn to the sum-of-four-dipoles on a table (FIGS. 17a–17c) which represents a possible application of the invention in a conference microphone realization.

Any of the aforementioned embodiments of the present invention may include a variety of microphone configurations for reception and application of the speech signal waveform as herein illustrated.

A simpler version of the present invention may be implemented without loss of effectiveness in response to the speech signal waveform containing only envelope shapes and timing information. In such instances, only the modified expandor may be utilized with some variations in time constants in accordance with a particular application. The simpler version of the present invention may be used with certain forms of tactile devices for the deaf where the speech signal waveform contains such information. Further, any of the aforementioned embodiments as described above may be configured wherein the modified compressor and expandor are interchanged such that the speech signal waveform is first expanded and then compressed yielding substantially similar reductions in noise and improved comprehension of speech. This configuration may achieve greater discrimination against background noise, but may encounter greater distortion.

It will be appreciated that the embodiments described above and illustrated in the drawings represent only a few of the many ways of implementing an enhanced effective signal to noise ratio for speech in noisy environments.

The compressor and expandor indicated, when such is used in the various embodiments, may be any commercially available compressor, expandor or compandor circuits. Further, such circuits may be constructed from electrical components, combinational logic, digital signal processing techniques implemented on a microprocessor or digital signal processor, or other devices capable of compressing and expanding a signal. In addition, the compressor and expandor may respectively include any functions (not merely square and square root functions) which are duals of each other to provide compression and expansion of a waveform.

The technique of effective signal to noise ratio enhancement of the present invention may be applied to systems utilizing a microphone, plurality of microphones, or other signal reception device in conjunction with electronic amplification for delivery of the enhanced speech signals to a listener, plurality of listeners, or a computer interface. Further, the present invention may be used in several applications including but not limited to: small wearable systems (i.e. hearing aids, tactile aids, cochlear implants and/or other hearing assistive devices), conference-microphone systems, and automatic speech recognition systems showing degraded performance in the presence of noise.

The microphones may be any conventional or other type microphone or device capable of receiving an acoustic input signal waveform and transducing it to an electrical audio signal. The operational amplifiers may be any commercially available operational amplifiers or equivalent circuit capable of amplifying a signal. The variable voltage controlled resistors (i.e., gain cells) may be any voltage or current controlled resistors or device capable of adjusting resistance. The resistors and capacitors may be conventional electronic components or combinations of the electronic components yielding the same electrical properties. Further, the diodes may be conventional diodes or other electrical devices limiting current flow or threshold voltage. The preamplifier and post-amplifiers may be conventional amplifiers or other equivalent circuits for amplifying signals. The headset may be any conventional headset or other device capable of conveying the enhanced speech signal waveform to a listener.

The effective signal to noise enhancement of the present invention may be implemented by utilizing any other circuit configurations for selective adjustment of the gain to reduce noise as compared to the speech signal.

From the foregoing description it will be appreciated that the invention makes available a novel method and apparatus for enhancing the effective signal to noise ratio of hearing assistive devices or communication systems implemented in noisy environments wherein a signal waveform is selectively expanded downward by a small amount by adjusting the gain of a circuit based upon the level of an input signal, and by means of a control signal extracted from the input signal.

Having described preferred embodiments of the new and improved method and apparatus for enhancing the effective signal to noise ratio of hearing assistive devices and communication systems implemented in noisy environments, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A signal enhancement apparatus for use in communication systems to enhance the effective signal to noise ratio of speech in a noisy environment without loss of spectral information and without introducing distortion into said speech, wherein amplitudes of said speech below a predetermined threshold are considered to be noise while amplitudes above the threshold are considered to be desired speech, said apparatus comprising:

input means for providing an input electrical speech signal waveform having mixed speech and noise components temporally spaced by noise alone; and noise reduction means for selectively attenuating portions of said input speech signal waveform having amplitudes below said predetermined threshold while passing portions of said input speech signal waveform having amplitudes above the threshold substantially unchanged, wherein said portions of said input speech signal waveform below the threshold are attenuated such that the greater the input speech signal waveform amplitude is below the threshold, the greater the input speech signal waveform is attenuated.

2. The apparatus of claim 1 wherein said noise reduction means includes:

an amplitude compressor for receiving and selectively compressing the amplitude of said input speech signal waveform by adjusting the gain of the compressor based on the amplitude of the input speech signal waveform such that in response to the amplitude of said input speech signal waveform overcoming a predetermined compression bias level, a corresponding portion of said input speech signal waveform is amplitude compressed; and an amplitude expandor for receiving and selectively expanding the amplitude of the compressed speech signal waveform by adjusting the gain of said expandor based on the amplitude of said compressed signal waveform such that in response to the amplitude of said compressed signal waveform overcoming a predetermined expansion bias level, a corresponding portion of said compressed speech signal waveform is amplitude expanded.

3. The apparatus of claim 2 further comprising:

a level control for controlling the level of the expanded speech signal waveform;

a post-amplifier for amplifying the level controlled expanded speech signal waveform; and output means for converting the post-amplified speech signal waveform to an acoustic output signal.

4. The apparatus of claim 2 wherein said expandor includes a control path for controlling said expandor, said control path including a first filter for passing frequency components of said compressed signal waveform in a specified frequency range and blocking other frequency components.

5. The apparatus of claim 4 wherein said first filter is a high pass filter having a low cutoff frequency of approximately 400 Hz.

6. The apparatus of claim 4 wherein said first filter is a lowpass filter having a high cutoff frequency of approximately 2,000 Hz.

7. The apparatus of claim 5 wherein said control path further includes a second filter comprising a low pass filter having a high cutoff frequency of approximately 2,000 Hz such that frequency components of the compressed signal waveform in the range of 400 Hz–2,000 Hz are passed while other frequency components are blocked.

8. The apparatus of claim 2 wherein said compressor includes a first bias source establishing said compression bias level, said compression bias level determining the minimum amplitude of said input signal waveform required for compression of said input signal waveform; and wherein said expandor further includes a second bias source establishing said expansion bias level, said expansion bias level determining the minimum amplitude of said compressed signal waveform required for expansion of said compressed signal waveform.

9. The apparatus of claim 8 wherein said compressor further includes:

a first gain cell comprising a first voltage controlled resistor for varying the gain of said compressor;

a first operational amplifier having a first feedback resistor connected in parallel with said gain cell;

a first integrator capacitor coupled to said first bias source and to said first gain cell;

a first discharge resistor connected in parallel with said first capacitor for providing a discharge path for said first integrator capacitor;

a decoupling capacitor connected to the output of the first operational amplifier;

a first detector connected in series with said decoupling capacitor for passing charging current to said first integrator capacitor in response to the amplitude of said input signal waveform exceeding said compression bias level; and a first charging resistor connected in series with said first detector for providing a charging path for said first integrator capacitor;

wherein in response to the amplitude of said input signal waveform being less than said compression bias level, said first integrator capacitor is charged to said compression bias level which is applied to said first gain cell such that the gain of said compressor is at a very low constant value; and wherein in response to the amplitude of said input signal waveform exceeding said compression bias level, said input signal waveform charges said first integrator capacitor to levels greater than said compression bias level to increase the gain of the compressor.

10. The apparatus of claim 9 wherein said expandor includes:

a second gain cell comprising a second voltage controlled resistor for varying the gain of said expandor;

a second operational amplifier connected in series with said gain cell and having a second feedback resistor;

a second integrator capacitor coupled to said second bias source and said second gain cell;

a second discharge resistor connected in parallel with said second integrator capacitor for providing a discharge path for said second integrator capacitor;

a coupling capacitor connected to an input of said expandor;

a second detector connected in series with said coupling capacitor for passing charging current to said second integrator capacitor in response to the amplitude of said compressed signal waveform exceeding said expansion bias level; and a second charging resistor connected in series with said second detector for providing a charging path for said second integrator capacitor;

wherein in response to the amplitude of said compressed signal waveform being less than said expansion bias level, said second capacitor is charged to said expansion bias level which is applied to said second gain cell such that the gain of said expandor is at a very low constant value; and wherein in response to the amplitude of said compressed signal waveform exceeding the expansion bias level, said compressed signal waveform charges said second capacitor to levels greater than said expansion bias level to increase the gain of said expandor.

11. The apparatus of claim 10 wherein said first and second integrator capacitors each have a charging time constant of approximately five to twenty milliseconds and a discharge time constant of approximately twenty to eighty milliseconds.

12. The apparatus of claim 10 wherein said expandor includes a clamp diode connected in parallel with said second integration capacitor to limit voltage applied to said second voltage controlled resistor and maintain a fixed gain for amplitudes of said compressed signal waveform exceeding a predetermined clamping threshold.

13. The apparatus of claim 1 wherein said input means includes a pre-amplifier for amplifying said input waveform, said apparatus further including:

an automatic gain control circuit for receiving said input speech signal waveform from said input means and adjusting the gain of said pre-amplifier based on said noise in said speech signal waveform.

14. The apparatus of claim 2 further including:

an automatic gain control circuit for receiving said speech signal from said input means and adjusting said compression bias level to control the gain of said compressor based on said noise in said speech signal waveform.

15. The apparatus of claim 2 wherein said compressor compresses said input speech signal waveform based upon a predetermined function of the amplitude of said input speech signal waveform, and said expandor expands said compressed signal waveform based upon a predetermined function of said amplitude of said compressed signal waveform.

16. The apparatus of claim 15 wherein said predetermined function for said expansion is the dual of the predetermined function for said compression.

17. The apparatus of claim 15 wherein said predetermined function for said compression is a square root function, and said predetermined function for said expansion is a square function.

19

18. The apparatus of claim 2 further including:
an automatic level control circuit for compressing said expanded signal waveform when the amplitude of said expanded signal waveform exceeds a level control threshold.

19. The apparatus of claim 1 wherein said noise reduction means includes:
an amplitude expandor for receiving and selectively expanding the amplitude of said input speech signal waveform by adjusting the gain of the expandor based on the amplitude of the input speech signal waveform such that in response to the amplitude of said input speech signal waveform overcoming a predetermined expansion bias level, a corresponding portion of said input speech signal waveform is amplitude expanded; and
an amplitude compressor for receiving and selectively compressing the amplitude of the expanded speech signal waveform by adjusting the gain of said compressor based on the amplitude of said expanded signal waveform such that in response to the amplitude of said expanded signal waveform overcoming a predetermined compression bias level, a corresponding portion of said expanded speech signal waveform is amplitude compressed.

20. The apparatus of claim 1 wherein said noise reduction means includes:
an amplitude expandor for receiving and selectively expanding the amplitude of said input speech signal waveform by adjusting the gain of the expandor based on the amplitude of the input speech signal waveform such that in response to the amplitude of said input speech signal waveform overcoming a predetermined expansion bias level, a corresponding portion of said input speech signal waveform is amplitude expanded.

21. A signal enhancement apparatus for use in communication systems to enhance the effective signal to noise ratio of speech in a noisy environment without loss of spectral information and without introducing distortion into said speech, wherein amplitudes of said speech below a predetermined threshold are considered to be noise while amplitudes above the threshold are considered to be desired speech, said apparatus comprising:
input means for providing an input electrical speech signal waveform having mixed speech and noise components temporally spaced by noise alone;
an analog-to-digital converter for digitizing said input speech signal waveform;
a memory for storing desired gain characteristics to attenuate portions of said input speech signal waveform having amplitudes below said predetermined threshold while passing portions of said speech signal waveform having amplitudes above the threshold substantially unchanged wherein the portions of the speech signal waveform below the threshold are attenuated such that the greater the input speech signal waveform amplitude is below the threshold, the greater the input speech signal waveform is attenuated;
processing means for processing said digitized speech signal waveform in accordance with the desired gain characteristics to determine a digital control signal for controlling application of a gain to said input speech signal waveform;
a digital-to-analog converter for converting said digital control signal to analog in order to control said application of said gain; and

20 a two-quadrant multiplier for applying gain to said input speech signal waveform based on said analog control signal in order to reduce said noise in said speech signal waveform.

22. A signal enhancement apparatus for use in communication systems to enhance the effective signal to noise ratio of speech in a noisy environment without loss of spectral information and without introducing distortion into said speech, wherein amplitudes of said speech below a predetermined threshold are considered to be noise while amplitudes above the threshold are considered to be desired speech, said apparatus comprising:
input means for providing an input electrical speech signal waveform having mixed speech and noise components temporally spaced by noise alone;
an analog-to-digital converter for digitizing said input speech signal waveform;
a memory for storing a desired gain response to attenuate portions of said input speech signal waveform having amplitudes below said predetermined threshold while passing portions of said speech signal waveform having amplitudes above the threshold substantially unchanged wherein the portions of the speech signal waveform below the threshold are attenuated such that the greater the input speech signal waveform amplitude is below the threshold, the greater the input speech signal waveform is attenuated;
processing means for processing said digitized speech signal waveform in accordance with the desired gain response to reduce said noise in said input speech signal waveform; and
a digital to analog converter for converting said digital reduced noise speech signal waveform from said processing means to analog in order to produce an acoustic output signal.

23. In a signal enhancement apparatus for use in communication systems, a method to enhance the effective signal to noise ratio of speech in a noisy environment without loss of spectral information and without introducing distortion into said speech, wherein amplitudes of said speech below a predetermined threshold are considered to be noise while amplitudes above the threshold are considered to be desired speech, said method comprising the steps of:
(a) providing an input electrical speech signal waveform having mixed speech and noise components temporally spaced by noise alone;
(b) selectively attenuating portions of said input speech signal waveform having amplitudes below said predetermined threshold while passing portions of said input speech signal having amplitudes above the threshold substantially unchanged wherein said portions of said input speech signal waveform below the threshold are attenuated such that the greater the input speech signal waveform amplitude is below the threshold, the greater the input speech signal waveform is attenuated.

24. The method of claim 23 wherein step (b) includes:
(b.1) selectively compressing the amplitude of said input speech signal waveform by adjusting the gain of said compression based on the amplitude of said input speech signal waveform such that in response to the amplitude of said input speech signal waveform overcoming a predetermined compression bias level, a corresponding portion of said input speech signal waveform is amplitude compressed; and
(b.2) selectively expanding the amplitude of the compressed speech signal waveform by adjusting the gain of said expansion based on the amplitude of said compressed signal waveform such that in response to the amplitude of said compressed signal waveform overcoming a predetermined expansion bias level, said corresponding portion of said compressed speech signal waveform is amplitude expanded.

25. The method of claim 24 wherein step (b) further includes the steps of:
 (b.3) controlling the level of said expanded speech signal waveform;
 (b.4) amplifying said level controlled expanded speech signal waveform; and
 (b.5) converting the post-amplified expanded speech signal waveform to an acoustic output signal.

26. The method of claim 24 wherein step (b.2) further includes:
 (b.2.1) passing frequency components of said compressed speech signal waveform in a specified range and blocking other frequency components via a first filter disposed in a control path for controlling said expansion.

27. The method of claim 26 wherein said first filter is a high pass filter and step (b.2.1) includes:
 (b.2.1.1) passing frequency components greater than approximately 400 Hz.

28. The method of claim 26 wherein said first filter is a lowpass filter and step (b.2.1) includes:
 (b.2.1.1) passing frequency components less than approximately 2.000 Hz.

29. The method of claim 26 wherein said first filter is a high pass filter and said frequency components are further passed via a second filter, disposed in said control path, comprising a low pass filter and step (b.2.1) further includes:
 (b.2.1.1) passing frequency components greater than approximately 400 Hz and less than approximately 2.000 Hz.

30. The method of claim 24 wherein step (b.1) further includes:
 (b.1.1) establishing said compression bias level via a first bias source to determine the minimum amplitude of said speech components required for compression of said input signal waveform; and
 step (b.2) further includes:
 (b.2.1) establishing said expansion bias level via a second bias source to determine the minimum amplitude of said speech components required for expansion of said compressed signal waveform.

31. The method of claim 24 wherein step (b.2) further includes:
 (b.2.1) limiting expansion of said compressed signal waveform by maintaining a fixed gain via a clamping diode for amplitudes of said compressed signal waveform exceeding a predetermined clamping threshold.

32. The method of claim 23 wherein step (a) further includes:
 (a.1) detecting the level of noise in said input speech signal waveform; and
 (a.2) amplifying the input speech signal waveform by adjusting the gain applied to said input speech signal waveform based on the level of said noise detected in said input speech signal waveform.

33. The method of claim 24 wherein step (a) further includes:
 (a.1) detecting the level of noise in said input speech signal waveform; and
 (a.2) adjusting said compression bias level based on the level of said noise detected in said input speech signal waveform.

34. The method of claim 24 wherein step (b.1) further includes:
 (b.1.1) compressing said input speech signal waveform as a predetermined function of the amplitude of said input speech signal waveform; and
 step (b.2) further includes:
 (b.2.1) expanding said compressed signal waveform as a predetermined function of said amplitude of said compressed signal waveform.

35. The method of claim 34 wherein the predetermined function for said expansion is the dual of the predetermined function for said compression.

36. The method of claim 34 wherein the predetermined function for said compression is a square root function, and said predetermined function for said expansion is a square function.

37. The method of claim 24 wherein step (b.2) further includes: (b.2.1) compressing said expanded signal waveform when the amplitude of said expanded signal waveform exceeds a level control threshold.

38. The method of claim 23 wherein step (b) includes:
 (b.1) selectively expanding the amplitude of said input speech signal waveform by adjusting the gain of said expansion based on the amplitude of said input speech signal waveform such that in response to the amplitude of said input speech signal waveform overcoming a predetermined expansion bias level, a corresponding portion of said input speech signal waveform is amplitude expanded; and
 (b.2) selectively compressing the amplitude of the expanded speech signal waveform by adjusting the gain of said compression based on the amplitude of said expanded signal waveform such that in response to the amplitude of said expanded signal waveform overcoming a predetermined compression bias level, said corresponding portion of said expanded speech signal waveform is amplitude compressed.

39. The method of claim 23 wherein step (b) includes:
 (b.1) selectively expanding the amplitude of said input speech signal waveform by adjusting the gain of said expansion based on the amplitude of said input speech signal waveform such that in response to the amplitude of said input speech signal waveform overcoming a predetermined expansion bias level, a corresponding portion of said input speech signal waveform is amplitude expanded.

40. In a signal enhancement apparatus for use in communication systems, a method to enhance the effective signal to noise ratio of speech in a noisy environment without loss of spectral information and without introducing distortion into said speech, wherein amplitudes of said input speech signal waveform below a predetermined threshold are considered to be noise while amplitudes above the threshold are considered to be desired speech, said method comprising the steps of:
 (a) providing an input electrical speech signal waveform having mixed speech and noise components temporally spaced by noise alone;
 (b) digitizing said input speech signal waveform;
 (c) storing desired gain characteristics in a memory to attenuate portions of said input speech signal waveform having amplitudes below said predetermined threshold while passing portions of said speech signal waveform having amplitudes above the threshold substantially unchanged wherein the portions of the speech signal waveform below the threshold are attenuated such that the greater the input speech signal waveform amplitude is below the threshold, the greater the input speech signal waveform is attenuated;

(d) processing said digitized speech signal waveform in accordance with the desired gain characteristics to determine a digital control signal for controlling application of a gain to said input speech signal waveform;

(e) converting said digital control signal to analog in order to control said application of said gain; and (f) applying gain to said input speech signal waveform based on said analog control signal in order to reduce said noise in said speech signal waveform.

41. In a signal enhancement apparatus for use in communication systems, a method to enhance the effective signal to noise ratio of speech in a noisy environment without loss of spectral information and without introducing distortion into said speech, wherein amplitudes of said input speech signal waveform below a predetermined threshold are considered to be noise while amplitudes above the threshold are considered to be desired speech, said method comprising the steps of:

(a) providing an input electrical speech signal waveform having mixed speech and noise components temporally spaced by noise alone;

(b) digitizing said input speech signal waveform;

(c) storing a desired gain response in a memory to attenuate portions of said input speech signal waveform having amplitudes below said predetermined threshold while passing portions of said speech signal waveform having amplitudes above the threshold substantially unchanged wherein the portions of the speech signal waveform below the threshold are attenuated such that the greater the input speech signal waveform amplitude is below the threshold, the greater the input speech signal waveform is attenuated;

(d) processing said digitized speech signal waveform in accordance with the desired gain characteristics to reduce said noise in said input speech signal waveform; and (e) converting said digital reduced noise speech signal waveform to analog in order to produce an acoustic output sianal.

* * * * *